Sept. 17, 1968     SINZO KIMURA ETAL     3,401,625
FULLY AUTOMATIC TOASTER

Filed March 16, 1967     7 Sheets-Sheet 1

Sinzo Kimura,
Michinori Nagahiro and
Hiroo Hosono,
INVENTORS

BY Wenderoth, Lind & Ponack
ATTORNEYS

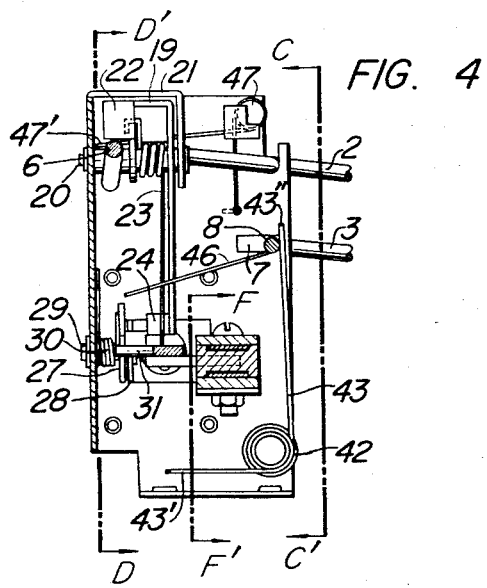
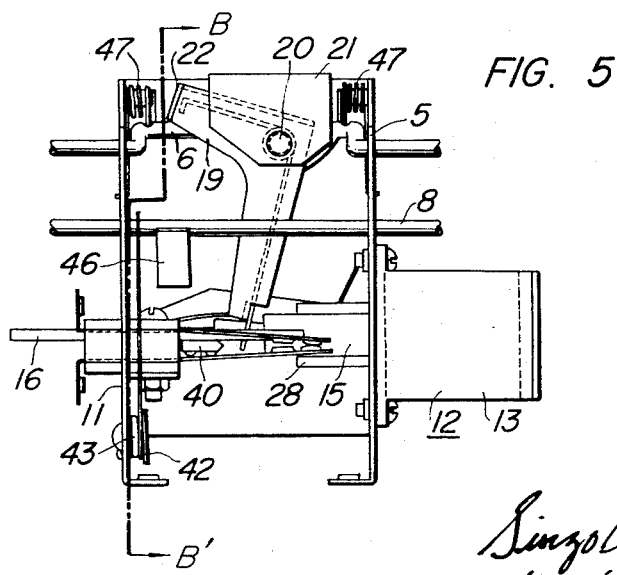

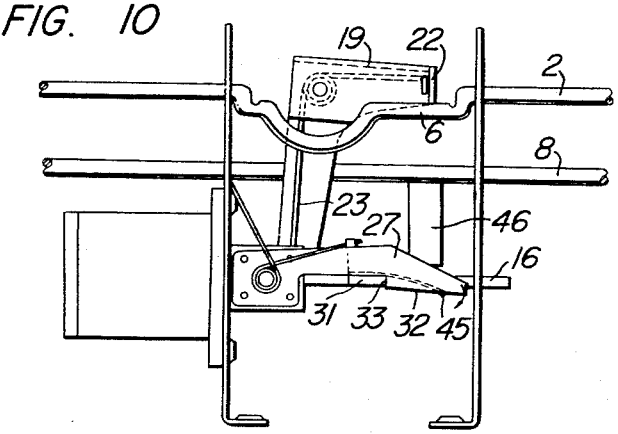
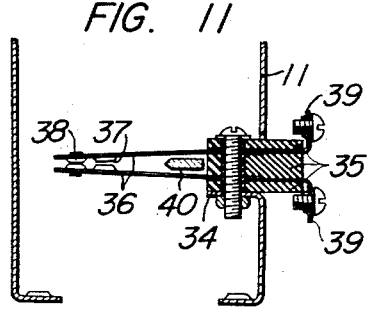
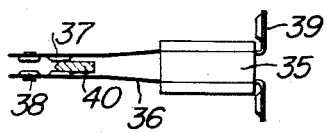
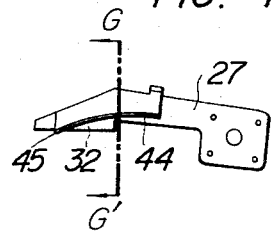
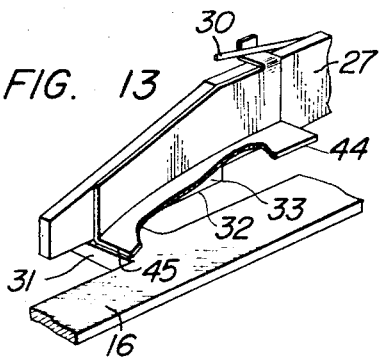
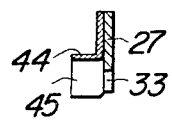

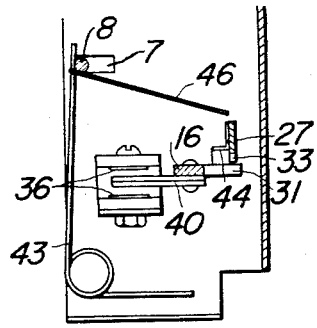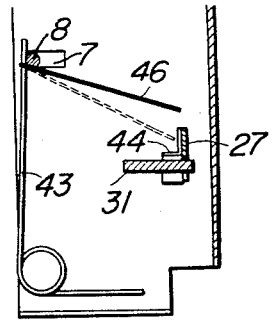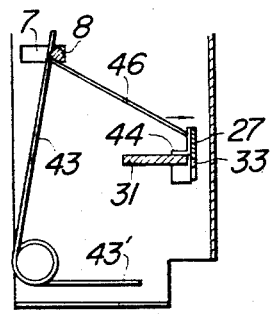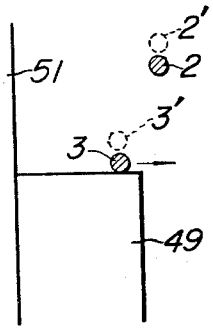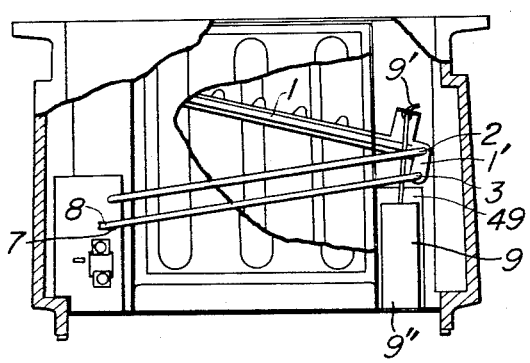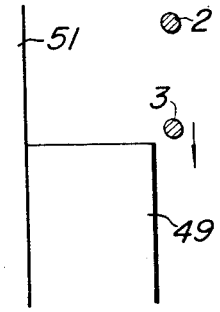

United States Patent Office 3,401,625
Patented Sept. 17, 1968

3,401,625
FULLY AUTOMATIC TOASTER
Sinzo Kimura, Higashi-Osaka-shi, Michinori Nagahiro, Hirakata-shi, and Hiroo Hosono, Osaka, Japan, assignors to Matsushita Electric Industrial Co., Ltd., Osaka, Japan, a corporation of Japan
Filed Mar. 16, 1967, Ser. No. 623,660
Claims priority, application Japan, Mar. 24, 1966, 41/18,572; May 19, 1966, 41/32,367; May 24, 1966, 41/33,753; Aug. 11, 1966, 41/52,915
9 Claims. (Cl. 99—329)

ABSTRACT OF THE DISCLOSURE

Fully automatic toaster having a bread carriage which is moved to and locked in its nontoasting position upon completion of toasting by the force of an electromagnet through pivotal levers, unlocked from its locked state in response to bread removal but still held in the nontoasting position by a balancing means, and moves downwardly by gravity to its toasting position against the balancing means when bread is replaced on it. The above operation is effected by a latch mechanism unlocked with little load, a stably operable unlocking mechanism and a stably operable electromagnet mechanism of low power.

---

This invention relates to automatic electric toasters and more particularly to improvements in a device for vertically moving the bread carriage in the so-called fully automatic toaster in which bread is automatically carried to a toasting position when it is merely inserted and after being toasted the bread is automatically carried to a takeout position. The present invention contemplates the provision, in such fully automatic toaster, of an electromagnet serving as power source means for causing vertical movement of a vertically movable bread carriage, latch means for locking the bread carriage in its upward position and means for gravitating the bread carriage by the weight of bread.

Bread carriage vertically moving devices of prior structure utilizing the thermal expansion and contraction of hot wires have been defective in that they have a slow speed of response, while those employing electromagnets or motors have also been defective in that they are expensive and can only be manufactured at a poor production rate.

*Summary of the invention*

It is one object of the present invention to provide an inexpensive and fully automatic device for vertically moving a bread carriage in a fully automatic toaster employing therein a quick-responsive, stable electromagnet as a power source.

Another object of the invention is to provide a vertically moving device in which latch means for locking the bread carriage in its upward position is unlocked when bread is taken out, with the bread carriage being held in its upward position by a balancing spring, and the latch means can be unlocked without any relation to the bread weight for thereby ensuring the unlocking with a minimum of load on the latch means.

A further object of the invention is to provide a vertically moving device in which a lever for unlocking the latch means can be directly actuated by movement of a power lever for the bread carriage so as to obtain the device at a low cost and at a high rate of production in view of an increased degree of safety.

A still further object of the invention is to provide a highly producible vertically moving device which is formed as a compact unit and contained in an enclosure so as to be free from any malfunction due to bread crumbs or the like.

Still another object of the invention is to provide a vertically moving device which ensures smooth vertical movement of the bread carriage by virtue of provision of stably operable buffer means by which the speed of attraction by an electromagnet is not directly imparted to the bread carriage.

Other objects of the invention include the provision of a mechanism having a very small-sized power source in which an electromagnet is used to give a force for lifting the bread carriage and is arranged so that a minimum load is exerted thereon; switch means which is economically simplified to give a higher stability and a longer service life than heretofore; a toaster whose main circuit would not be energized in an empty state even if the bread carriage held at its upward position by the force of a spring is urged downwardly by shocks imparted to the toaster; a toaster in which bread can be lowered by the force of gravity and the power is only imparted during upward movement of the bread carriage so that the toaster has a remarkably long service life and consumes little power in spite of provision of a power source of short-time rating (in prior toasters, arrangement has been such that electrical contacts are energized or deenergized when bread is inserted in the toaster); a mechanism which can always urge the bread carriage upwardly under a constant state irrespective of various weights of bread; a toaster having its vertically moving device section disposed independently of the main body section in order to ensure an extremely high workability during assembling; and a mechanism by which the bread carriage locked in its upward position cannot be unlocked by any shock.

FIG. 4 is a section taken on the line B–B' in FIG. 5 to show the detail of the vertically moving mechanism.

FIG. 5 is a section taken on the line C–C' in FIG. 4 to show the detail of the vertically moving mechanism.

FIG. 10 is a detail view shown another operative state of the vertically moving device in which the bread carriage is shown in its upward position.

FIG. 11 is a section taken on the line F–F' in FIG. 4 to show a switch section in the vertically moving device, the switch section being shown in its operative state.

FIG. 12 is a view similar to FIG. 11, but the switch section being shown in its inoperative state.

FIG. 13 is a perspective view showing a latch section in the vertically moving device.

FIG. 14 is a front view of a latch element in the latch section shown in FIG. 13.

FIG. 15 is a section taken on the line G–G' in FIG. 14.

FIGS. 16 to 18 are sections taken on the line H–H' in FIG. 6 to show various operative states of the latch section.

FIG. 19 is a front elevational of the toaster showing the operative state of the vertically moving device when bread is taken away from the bread carriage.

FIG. 20 is a diagrammatic sectional view showing the positions of pivotal levers for the bread carriage when shock is imparted to the entire toaster.

FIG. 21 is a diagrammatic sectional view showing the positions of the pivotal levers when bread is again inserted under the state of FIG. 20.

The inventive idea embodied as the vertical moving device of the invention can find various applications. Detail structure and operation of one embodiment according to the present invention will now be described with reference to the drawings so that those skilled in the art can understand the wide applicability and practicability of the invention.

Figure 1:
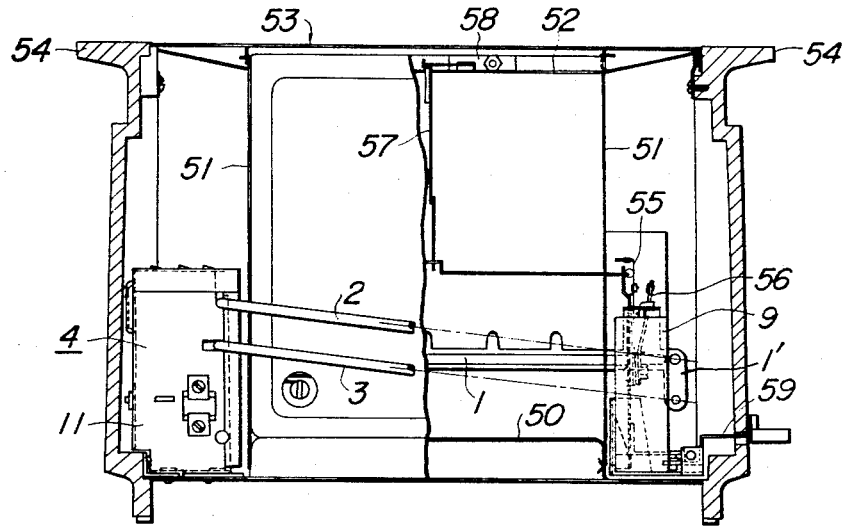
FIG. 1 is a front elevational view, partly in section, of a fully automatic toaster equipped with the vertically moving device according to the present invention.
Figure 2:
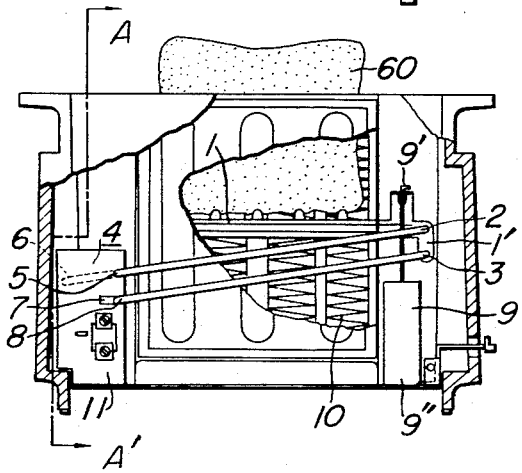
FIG. 2 is a front elevational view of the toaster showing the operative state of the vertically moving device at the completion of toasting.

Referring to FIGS. 1 and 2, there is shown a fully automatic toaster in which two side frames 51 are fixed to a toaster base 50 and three bread toasting plate heaters 10 are vertically disposed between the side frames 51 to define two ovens. A bread carriage 1 vertically movable in the ovens is formed in a U-shaped structure from a sheet of metal material (FIG. 22) and is arranged to make vertical movement along two guide holes 51' on one side frame 51. Aligned holes are bored through a bent portion 1' of the bread carriage 1 to receive therein two pivotal levers 2 and 3 of the bar material arranged in parallel. One of the levers 2 is bent in a rectangular fashion so as to make swinging movement about bearings 5 on opposite side faces of a casing 11 containing therein the entire vertically moving device as will be described later. The other lever 3 is passed at its bent portion 8 through slot-like bearings 7 on the opposite side faces of the casing 11, and is bent in a rectangular fashion as in the case of the lever 2. Opposite ends of the lever 3 are pivotally connected to the bread carriage 1. As a result, under a state in which bread is placed on the bread carriage 1, the pivot point of the lever 3 is at the right-hand end of the slot 7 as shown in FIG. 2 to hold the bread carriage 1 in its horizontal position. Since the pivot point 8 at one end of the lever 3 is slidable in the slot 7, the bread carriage 1 is tilted upwardly by the force of a spring (as will be described later) when the bread is taken away. This arrangement obviates the use of a separate lever interengaged with the bread carriage as in the prior toaster and ensures positive operation.

On the right-hand side of the bread carriage 1, there is an air damper 9 which supports a piston 9' thereon. The piston 9' of asbestos or like material is accommodated in a damper casing 9" of aluminum or like material (not shown).

Figure 3:
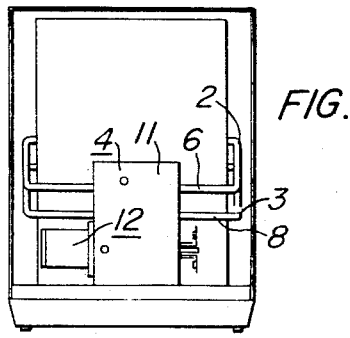
FIG. 3 is a section taken on the line A–A' in FIG. 2 to show the detail of inner structure of the toaster.

In FIG. 3 there is shown the casing 11, in side elevation, which serves also as the bearings for the pivotal levers 2 and 3. A plunger type of electromagnet 12 is secured to one side face of this casing 11.

Figure 6:
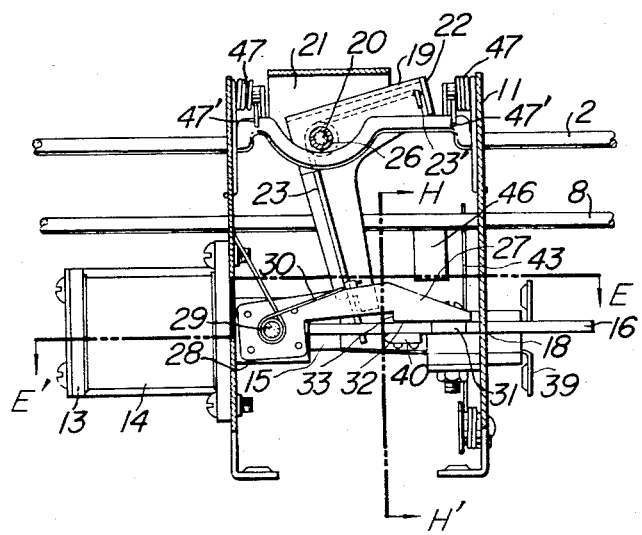
FIG. 6 is a section taken on the line D–D' in FIG. 4 to show the detail of the verticaly moving mechanism.
Figure 7:
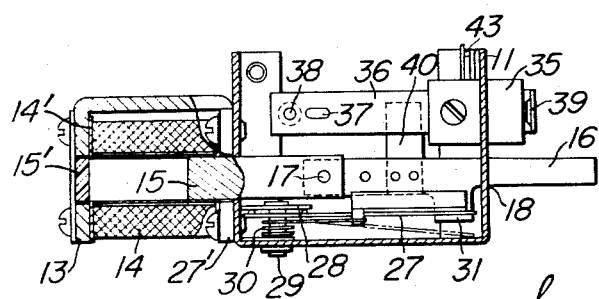
FIG. 7 is a section taken on the line E–E' in FIG. 6 to show the detail of the verticaly moving mechanism.

Referring to FIGS. 4, 5, 6 and 7, the plunger type of electromagnet 12 comprises a plunger 15 of 8 mm. in diameter and about 30 mm. long, a coil 14 wound about a bobbin 14', and a U-shaped yoke 13 about 25 mm. thick, and is secured to the side face of the casing 11 by means of screws (FIG. 7). A guide bar 16 is secured to the front end of the plunger 15 by a pin 17 and has its front end passed through a guide hole 18 provided on the opposite side face of the casing 11 in a manner that the guide bar 16 can make linear parallel movement without any friction thereon.

Figure 8:
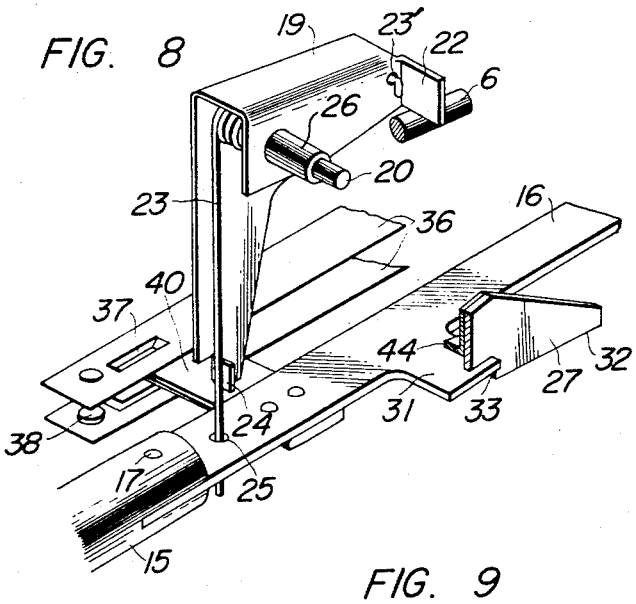
FIG. 8 is a perspective view showing principal parts of the vertically moving mechanism.
Figure 9:
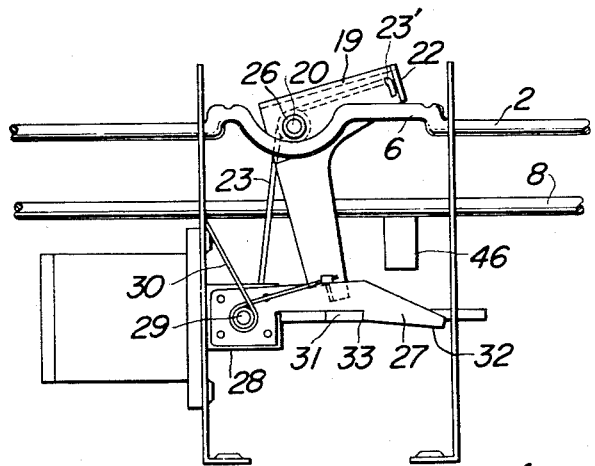
FIG. 9 is a detail view showing one operative state of the vertically moving device in which an electromagnet is shown in its attracting or energized state.

In addition to the shape as described previously, the pivotal lever 2 is bent in a U-like fashion (in the form of >) at that portion 6 beyond the bearings 5 and this portion 6 is engaged by an actuating lug 22 provided on one end of an L-shaped direction changing lever 19. More precisely, the point of engagement between the actuating lug 22 and the portion 6 of the lever 2 is arranged in a manner that the ratio of the distance between this point and the bearing 5 to the distance between the end of the lever 2 connected to the beard carriage 1 and the bearing 5 gives a lever ratio of about 1:5, and the actuating lug 22 normally urges the portion 6 of the pivotal lever 2 downwardly. The lever ratio of the pivotal lever 2 and the lever ratio of the L-shaped direction changing lever 19 are so selected as to give a suitable vertically moving distance of the bread carriage 1 which is required to be about 50 mm. in this case and to suit a retracting distance of the plunger 15 which is preferably to be about 16 to 18 mm. in view of the economical size and power of the electromagnet 12. The L-shaped direction changing lever 19 has a lever ratio of about 1:1.5 and has a double-walled, U-like structure at its upper portion through which a shaft 20 extends to be rotatably supported in a bearing plate 21 bent from a portion of the casing 11. A coil spring 23 is mounted on the shaft 20 and has its one end extending into a central hole on the guide bar 16 while being abutted at its intermediate portion by a lug 24 cut and bent from the long arm of the lever 19 and has the other end anchored to the end 23' of the short arm of the lever 19. Therefore the pivotal lever 2 is operatively associated with the plunger 15 by the spring-loaded direction changing lever 19. The direction changing lever 19 as described above is employed herein because the electromagnet 12 of horizontal type can be disposed nearer to the lower part of the toaster base 50, that is, at a position which is least possible to be affected by an increase in temperature. As shown in FIG. 8, a ring 26 having the spring 23 mounted thereon is rotatably mounted on the shaft 20 and passes through the direction changing lever 19 so as to prevent the friction by the coil spring 23 from being transmitted to the shaft 20.

A portion of one side plate of the casing 11 is cut and bent to form a bearing 28 for receiving therein a shaft 29 for a latch element or plate 27. This latch plate 27 has a bore diameter slightly larger than the diameter of the shaft 29 so that the plate 27 is rockable to and fro. Further, the latch plate 27 is in contact with the bearing portion 28 through a plurality of projections 27' protruding therefrom. A spring 30 is mounted on the shaft 29 between the latch plate 27 and the casing 11 and has one end thereof anchored to a bent portion at an intermediate part of the latch plate 27 and has the other end thereof anchored to a portion of the casing 11 so as to normally urge the latch plate 27 in the clockwise direction. Further, the coiled portion of the spring 30 acts as a push spring as shown in FIG. 7 so as to normally urge the latch plate 27 onto the bearing 28 for thereby maintaining a parallel relation between the latch plate 27 and the plunger guide bar 16. Thus, the latch plate 27 is not only swingable in the vertical direction but also swingable toward the side plate of the casing 11 as shown by two-dot chain lines in FIG. 7.

Referring to FIG. 8, the guide bar 16 connected to the plunger 15 is provided with a projection or abutment 31 which can engage with a stepped-portion 33 on the latch plate 27. In an unlatched state, that is, before or during the retracting movement of the plunger 15, the latch plate 27 rides or rests on the abutment 31 of the guide bar 16 as shown in FIG. 6. Under the above state, an engaging member 32 on the latch plate 27 is in parallel with the plunger guide bar 16. Therefore in the retracting movement of the plunger 15 by the electromagnet 12, the latch plate 27 would not operate until the abutment 31 moves to the position of the stepped portion 33 on the latch plate 27. By virtue of the above structure, the latch structure of the invention would not swing in its latch-releasing direction before the latch is applied by the retracting movement of the plunger unlike the prior toaster and can thereby apply a positive latch.

Referring to FIGS. 13 and 14, an L-shaped ledge-like member 44 is fixed as by spot welding to that portion of the latch plate 27 ranging from the center to one end on one side face thereof. The ledge-like member 44 has its end 45 slightly projecting beyond the lower face of the engaging member 32 of the latch plate 27. The ledge-like member 44 has an arcuate lower face as shown in FIG. 14. Referring to FIGS. 4, 16, 17 and 18, an unlatching member or plate 46 is engageable with the latch plate 27. The unlatching plate 46 is formed from a leaf spring and is secured at one end to that portion 8 of the pivotal lever 3 between the bearings 7 so that it engages with the latch plate 27 at a certain operating point to unlock the latch by the latch plate 27, as will be described later.

Referring to FIGS. 5, 11 and 12, description will be directed to a switch section in the device. This switch is operative to deenergize the main circuit for the toasting heaters 10 in interengaging relation with the attraction of the electromagnet 12 in a manner as will be described later and comprises two contact plates 36 arranged in parallel with the plunger guide bar 16. Projections 37 extend toward each other from the opposite contact plates 36 at a point adjacent to contacts 38. These contact plates 36 are held in an electrical insulator 35 which is secured by screws to a stationary part 34 cut and bent from the casing 11. Terminal plates 39 are also unitarily held in the electrical insulator 35 so as to be connected to the wiring at the outside of the casing 11.

In order to urge the contact plates 36 to the open and closed positions, a switch actuating member 40 of electrically insulating material is fixed to a substantially central portion of the plunger guide bar 16 and disposed parallelly between the opposite contact plates 36. In the retracting movement of the guide bar 16 by attraction by the electromagnet 12, the actuating member 40 is retracted from the state of FIG. 11 to the state of FIG. 12 to urge the projections 37 away from each other to open the contacts 38. The contact opening operation and the locking operation by the latch plate 27 are so timed that the switch 38 is turned off immediately before the latch is imparted. Such timing is necessary in order to deal with the large force of inertia involved in the electromagnet.

As described previously, the lower pivotal lever 3 of the two pivotal levers 2 and 3 is movable to and fro in interengaging relation with the tilting movement of the bread carriage 1. A spring 43 is provided to cause the to-and-fro movement of the lever 3 as shown in FIGS. 4, 16, 17 and 18. More precisely, this spring 43 is operative to tilt the bread carriage 1 upwardly when no bread is placed thereon and also operative to disengage the latch plate 27 from the guide bar 16. This spring 43 is held on the inside face of the casing 11 by a disc-like spring holder 42 and has one end 43' thereof anchored to the lower part of the casing 11 and the other end 43'' thereof engaged by the portion 8 of the pivotal lever 3 to normally urge the portion 8 of the lever 3 leftwardly as viewed in FIG. 4. By the force of this spring 43, the portion 8 of the pivotal lever 3 is disposed at the right-hand end of the slot 7 when bread is placed on the bread carriage 1 as shown in FIG. 2 to hold the bread carriage 1 in its horizontal position but is urged to the left-hand end of the slot 7 when bread is taken away as shown in FIG. 19 so that the bread carriage 1 is tilted upwardly.

Referring to FIGS. 4, 5 and 6, two balancing springs 47 engaging the pivotal lever 2 are held on the inner faces of the casing 11 in a manner that one end 47' of each spring 47 normally urges the portion 6 of the pivotal level 2 downwardly, that is, such end 47' normally urges the bread carriage 1 upwardly. The force of these springs 47 is so set that the bread carriage 1 can be held at its upward position (nontoasting position) when no bread is placed on the carriage 1 as shown in FIG. 19 but the bread carriage 1 moves downwardly to the toasting position by the weight of bread when the bread is placed thereon.

Figure 22:
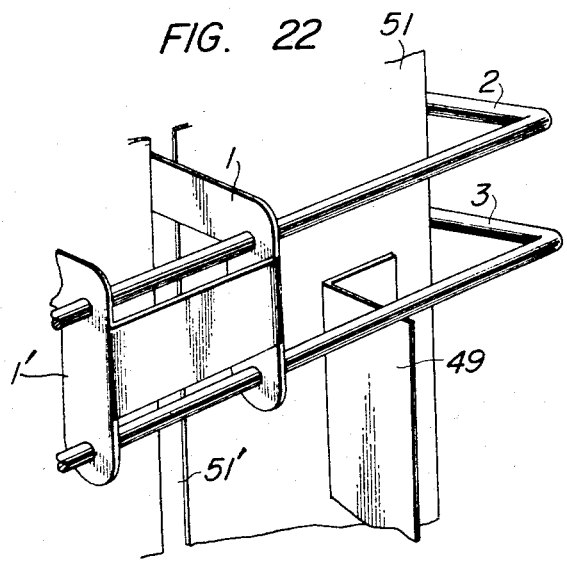
FIG. 22 is a perspective view of a lever supporting member shown in section in FIGS. 20 and 21.

Referring next to FIGS. 20 to 22, shockproof means for the pivotal levers will be described. The bread carriage 1 is held in its upward position by the force of the balancing springs 47 when no bread is placed thereon as described above and thus no problem whatsoever occurs under normal conditions. When, however, shock is imparted thereto as by dropping of the entire toaster, the shock imparted to the balancing springs 47 may result in downward movement of the bread carriage 1. In order to prevent such movement from occurring, a ledge-like member 49 is provided on the side frame 51 upstanding from the toaster base 50. Suppose now that the pivotal lever 3 takes a position 3' as shown in FIG. 20 when bread is taken away. Then when shock is imparted thereto, the lever 3 falls down onto the ledge-like member 49 as shown by 3 and is prevented from further downward movement. When subsequently bread is placed on the carriage 1, the lever 3 moves rightwardly as shown in FIG. 21 so that the bread carriage 1 can freely move to its toasting position.

Figure 23:
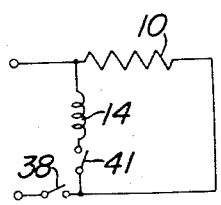
FIG. 23 is a circuit diagram for the fully automatic toaster employing therein the vertically moving device according to the present invention.

Referring to FIG. 23, the main switch 38 is disposed in series with the toasting heaters 10, and the electromagnet coil 14 and an electromagnet circuit on-off switch 41 are disposed in parallel with the above circuit. The switch 41 is actuated by the temperature-depending deflection of bimetal means 57 disposed adjacent to the bread surface in FIG. 1. The switch 41 consists of contact plates 55 and 56 and is connected to the bimetal 57 by a connecting rod 58. An adjusting lever 59 is provided to effect adjustment of the position of the switch 41 relative to the bimetal 57. The bimetal 57 is mounted on a U-shaped connection member 52 disposed immediately above the side frames 51 on the toaster base 50. The outer casing of the toaster is made of a unitary structure of an upper cover 53, side covers 54 and base 50 as shown in FIG. 1. The vertically moving device is generally designated by numeral 4 in FIG. 1 and is secured between the oven side frame 51 and the outer casing side cover 54 as by screws.

*Operation*

When bread is placed on the bread carriage 1 at its upward position as shown in FIG. 19, the bread carriage 1 is urged to take its horizontal position to move to its toasting position against the force of the balancing springs 47 without abutting the ledge-like supporting member 49 shown in FIG. 20. In this case, the pivotal portion 8 of the pivotal lever 3 moves to the right-hand end of the slot 7 on the casing 11 as shown in FIG. 2 to support the bread carriage 1 in its horizontal position, while the latch is still in the unlocked state as shown in FIGS. 6 and 7.

By the downward movement of the carriage 1, the L-shaped direction changing lever 19 engaging with the portion 6 of the pivotal lever 2 is swung to the state as shown in FIGS. 6 and 7 so that its spring 23 causes the sliding return movement of the plunger guide bar 16 to its non-attracted position and resultant movement of the switch actuating member 40 to its position shown in FIG. 5 closes the main switch 38 to thereby energize the main circuit for the toasting heaters 10 whereby toasting is started. Under this situation, since the ledge-like member 44 of the latch plate 27 rests on the abutment 31 as shown in FIG. 18, sliding movement of the abutment 31 provided on the plunger guide bar 16 to the nonattracted position causes upward movement of the latch plate 27 along the longitudinal slope of the ledge-like member 44. When the abutment 31 is advanced to the position of the end 45 of the ledge-like member 44, the side face of the latch plate 27 is disengaged from the abutment 31 and the latch plate 27 is urged by the spring 30 so that the engaging member 32 of the latch plate 27 rides on the guide bar 16 as shown in FIG. 6. As the toasting proceeds, the bimetal 57 disposed adjacent to the bread surface deflects rightwardly in FIG. 1 to urge the switch contact plate 55 toward the opposite contact plate 56. At the moment these contact plates 55 and 56 are brought into contact (this contacting moment being suitably adjusted depending on the desired toasting tint of bread), the plunger 15 of the electromagnet 12 is attracted with the result that the switch actuating member 40 on the plunger guide bar 16 forces in between the projections 37 on the contact plates 36 to open the main switch 38. The plunger bar 16 still continues to move by its inertia and is caused to stop when the stepped portion 33 of the latch plate 27 engages with the abutment 31 of the plunger guide bar 16. Under this situation, the plunger 15 is stopped by being abutted by a buffer member 15' on the yoke 13.

By the movement of the plunger guide bar 16, the L-shaped direction changing lever 19 is urged to swing by the spring 23. The actuating lug 22 at one end of the direction changing lever 19 urges the portion 6 of the pivotal lever 2 downwardly so that the pivotal levers 2 and 3 make counter-clockwise swinging movement about the pivot points 5 and 8 to more the bread carriage 1 to its nontoasting position. Any abrupt attraction of the plunger 15 is absorbed by the spring 23 and the air damper 9 engaging the bread carriage 1 acts to prevent abrupt upward movement of the bread carriage 1 which therefore moves upwardly at a suitably slow speed. Simultaneously with the upward movement of the bread carriage 1, the portion 8 of the pivotal lever 3 makes swinging movement with the result that the unlatching leaf spring 46 fixed thereto moves its position as shown by solid lines to a position as shown by dotted lines in FIG. 17.

Then when the bread at its nontoasting position is taken away, the force of the spring 43 urging the portion 8 of the pivotal lever 3 urges this portion 8 along the slot 7 to tilt the bread carriage 1 upwardly and at the same time the leaf spring 46 urges the latch plate 27 to disengage the abutment 31 of the plunger guide bar 16 from the stepped portion 33 of the latch plate 27 so that the latch plate 27 comes to a position as shown by two-dot chain lines in FIG. 7, that is, a position as shown in FIG. 18 and its ledge-like member 44 rides on the abutment 31. As a result, the bread carriage 1 is inclinedly held at its nontoasting position by the force of the balancing springs 47 and one cycle is thus completed. Under this situation, if the portion 8 of the pivotal lever 3 moves back to the original position in the slot 7 and unlatching leaf spring 46 is retracted to the position as shown in FIG. 17, any engagement between the stepped portion 33 of the latch plate 27 and the abutment 31 never takes place.

Further if any vibration might be imparted to the toaster with the power supply cord connected thereto even though toasting has been completed, the pivotal levers 2 and 3 move downwardly to rest on the ledge-like member 49 on the oven side frame 51 and would not make any further downward movement. Therefore any malfunction that the main switch is unintentionally turned on under the empty state does not take place at any event.

Subsequent cycles are the repetition of the operation as described above, but the toasting operation will be described in more details placing emphasis on the operation of the latch section. The bread carriage 1 is held in its upward position by the balancing springs 47. Since the minimum weight of bread is about 20 to 25 grams, the amount of balancing is such as to completely support the weight of the bread carriage 1 and yet to cause smooth downward movement of the bread carriage 1 by placement thereon of bread of 20 to 25 grams in weight. In the next place, the unlatching force must be as small as possible since the horizontal movement of the pivotal lever 3 by the force of the spring 43 is relied on to effect the unlatching. It is therefore so arranged that the force of the buffer spring 23 is not directly imparted to the latch section during unlatching of the same. This is accomplished by provision of the stopper 24 on the L-shaped direction changing lever 19 in order to limit the relative movement of the L-shaped direction changing lever 19 and the guide bar 16 to less than a fixed stroke. By the provision of such stopper 24, the force of the buffer spring 23 is blocked by the L-shaped lever 19 during the latched state and the force of the spring 43 can always effect stable unlatching.

The unlatching operation will next be analyzed. When toasting is started, the direction changing lever 19 interengaged with the pivotal lever 2 is swung from the state of FIG. 10 to the state of FIG. 6, while the coil spring 23 mounted in the lever 19 is not stretched and is operative to cause sliding movement of the plunger guide bar 16 to its non-attracted position. Since under this situation the ledge-like member 44 of the latch plate 27 rests on the abutment 31, the sliding movement of the abutment 31 in the horizontal direction causes upward movement of the latch plate 27 along the longitudinal slope of the ledge-like member 44. (At this time, the abutment 31 does not engage with the stepped portion 33 of the latch plate 27.) Then when the horizontally sliding abutment 31 moves to the end 45 of the ledge-like member 44, the abutment 31 is disengaged from the side face of the latch plate 27 and the push spring action of the latch spring 30 causes the latch plate 27 to return to its position as shown in FIG. 13. By the above operation, the latch can be readily applied when the plunger 15 is again attracted by the electromagnet 12.

In the foregoing description, the features of the toaster having the bread carriage vertically moving device according to the invention have been explained. The present invention with such features can be summarized as follows:

(1) In the toaster of the type in which the connection between a latch element 27 and an abutment 31 is disengaged when bread is taken away from a bread carriage 1 held in its nontoasting position and the bread carriage 1 can be still held in its nontoasting position by balancing springs 47, a stoppper 24 is provided to restrict the contraction of a spring 23 beyond a certain angle in order to minimize the force to be imparted to the latch.

(2) Unlike the prior unlatching mechanism having a lever interengaging with the bread carriage 1, unlatching is effected in the invention by to-and-fro movement of one of two pivotal levers. Thus, the inventive mechanism has a simplified structure, requires a less number of moving parts, shows an improved stability in operaton and can be manufactured with better producibility.

(3) An electromagnet 12 being a power source for causing upward movement of the bread carriage 1 can be economically made to a very small size by taking a balance between it and the bread carriage 1, and provision of a direction changing lever 19 permits disposition of the electromagnet 12 at the lower part of the toaster base to give an improved safety against heat up and noise.

(4) Unlike the prior mechanism in which the latch element is unlocked by the bread weight, the force of a spring 43 is used for the unlocking in the invention. This arrangement is advantageous in that the latch releasing force of fixed value can be always imparted to the latch which can therefore make stable operation.

(5) In a circuit arrangement including therein the electromagnet 12, the shape of a main circuit switch 38 can be simplified, the service life of contacts can be extended and the number of switches in the circuit can be reduced by virtue of the fact that the force of the electromagnet 12 is utilized to deenergize the switch 38. This is a great improvement over the prior arrangement in which the thermostat is utilized to deenergize the main switch.

It will be recognized that the invention is not limited to the specific details of the embodiment herein shown and described but includes such modifications and variations which may be made without departing from the scope of the appended claims.

What is claimed is:

1. A fully automatic toaster comprising in combination bread toasting heater means, a loadable bread carriage cyclically movable relative to said bread toasting heater means from a nontoasting position to a toasting position and then back to said nontoasting position, and control means including power means for moving said bread carriage to its nontoasting position with bread carried by said bread carriage, said control means comprising lever means having pivotal levers operatively engaged by said power means for causing vertical movement of said bread carriage and connected at one end thereof to said bread carriage for causing swinging movement of the latter, latch means for locking said bread carriage in its nontoasting position in cooperation with said power means, balancing means for said bread carriage for holding said bread carriage in its upward nontoasting position when bread is unloaded from said bread carriage and the carriage has swung upwardly, and unlocking means operative in response to loading of bread on and unloading of bread from said bread carriage, whereby said bread carriage is locked in its nontoasting position by said power means upon completion of bread toasting, is unlocked from its locked state when the bread is removed therefrom and is held in its nontoasting position by said balancing means.

2. A fully automatic toaster comprising in combination bread toasting heater means, a loadable bread carriage cyclically movable relative to said bread toasting heater means from a nontoasting position to a toasting position and then back to said nontoasting position, and control means including power means for automatically gravitating said bread carriage to its toasting position when bread is placed on said carriage and moving said bread carriage to its nontoasting position upon completion of bread toasting, said control means comprising lever means having two parallelly disposed pivotal levers mounting said bread carriage on their front ends for causing vertical movement of said carriage, one of said pivotal levers being pivotally supported at the other end so that its pivot point is parallelly slidable over a predetermined distance and having a spring associated therewith for urging said bread carriage in a direction of vertical swinging movement, latch means for locking said bread carriage in its nontoasting position in cooperation with said lever means, and means urged by the parallel movement of one of said two pivotal levers for unlatching said latch means in response to loading of bread on and unloading of bread from said bread carriage.

3. A fully automatic toaster comprising in combination bread toasting heater means, a loadable bread carriage cyclically movable relative to said bread toasting heater means from a nontoasting position to a toasting position and then back to said nontoasting position, and vertically moving means for said bread carriage comprising lever means having two parallelly disposed pivotal levers mounting said bread carriage on their front ends for causing vertical movement of said carriage, one of said pivotal levers being pivotally supported at the other end so that its pivotal point is movable to and fro by the pressure of a spring for thereby causing swinging movement of said bread carriage, means for normally biasing said bread carriage to its nontoasting position but allowing said bread carriage to freely move to its toasting position by gravity in response to placement of bread on said bread carriage, latch means operatively connected with power source means for locking said carriage in its nontoasting position with the bread carried by said bread carriage, power transmission means engaged by said lever means for moving said bread carriage to its nontoasting position with the bread carried by said bread carriage, and spring means interposed between said power transmission means and said lever means for holding said bread carriage in its nontoasting position at a point of development of a predetermined force, said power transmission means having stopper means for limiting movement more than a predetermined stroke of said power source means relative to said pivotal lever so that said latch means can be urged to its latch position at said point of development of force, said bread carriage can be locked in its nontoasting position by said spring means and the force of said spring means may not be directly imparted to said latch means during unlatching of said latch means.

4. A fully automatic toaster comprising in combination bread toasting heater means, a loadable bread carriage cyclically movable relative to said bread toasting heater means from a nontoasting position to a toasting position and then back to said nontoasting position, and control means including power means for moving said bread carriage to its nontoasting position with bread carried by said bread carriage, said control means comprising lever means having pivotal levers operatively engaged by said power means for causing vertical movement of said bread carriage and connected at one end thereof to said bread carriage for causing swinging movement of the latter, latch means for locking said bread carriage in its nontoasting position in cooperation with said power means, balancing means engaged by said lever means for holding said bread carriage in its upward nontoasting position when bread is unloaded from said bread carriage and the carriage has swung upwardly, unlocking means operative to unlatch said latch means in response to parallel movement of said lever means which is caused when bread is removed from said bread carriage locked in its nontoasting position with the bread carried thereby, and auxiliary support means in the form of a ledge-like member for supportinf said bread carriage in its upward state when the bread is removed therefrom in its nontoasting position, said auxiliary support means being operative to prevent unintentional falling of said bread carriage due to shock and to release the engagement therebetween as soon as bread is placed on said bread carriage.

5. A fully automatic toaster comprising in combination bread toasting heater means, a loadable bread carriage cyclically movable relative to said bread toasting heater means from a nontoasting position to a toasting position and then back to said nontoasting position, lever means having two parallelly disposed pivotal levers mounting said bread carriage on their front ends for causing vertical movement of said carriage, one of said pivotal levers being pivotally supported at the other end so that its pivot point is parallelly slidable to and fro by the pressure of a spring for thereby causing swinging movement of said bread carriage, means for normally biasing said bread carriage to its nontoasting position but allowing said bread carriage to freely move to its toasting position by gravity in response to placement of bread on said bread carriage, electromagnet means operatively associated with said lever means for moving said bread carriage to its nontoasting position with the bread carried by said carriage, power spring means interconnecting said electromagnet means with said lever means, abutment means provided on a guide bar directly coupled to the plunger of said electromagnet means for engagement with below-mentioned latch means in the retracted or attracted position of said plunger, and latch means engageable with said abutment means so as to lock said plunger in its attracted position upon completion of toasting to thereby urge said lever means through said power spring means to such position at which said bread carriage carrying the bread thereon is moved to and locked at its nontoasting position.

6. A fully automatic toaster comprising in combination bread toasting heater means, a loadable bread carriage cyclically movable relative to said bread toasting heater means from a non-toasting position to a toasting position and then back to said non-toasting position, lever means having two parallelly disposed pivotal levers mounting said bread carriage on their front ends for causing vertical movement of said carriage, one of said pivotal levers being pivotally supported at the other end so that its pivot point is parallelly slidable to and fro by the pressure of a spring for thereby causing swinging movement of said bread carriage, means for normally biasing said bread carriage to its nontoasting position but allowing said bread carriage to freely, move to its toasting position by gravity in response to placement of bread on said bread carriage, electromagnet means operatively associated with said lever means for moving said bread carriage to its nontoasting position with the bread carried by said carriage, power spring means interconnecting said electromagnet means with said lever means, abutment means provided on a guide bar directly coupled to the plunger of said electromagnet means for engagement with a latch means in the retracted or attracted position of said plunger, said latch means being adapted to lock said plunger when engaged with said abutment means in its attracted position upon completion of toasting to thereby urge said lever means through said power spring means to such position at which said bread carriage carrying the bread thereon is moved to and locked at its nontoasting position, said latch means being swingable in two directions and disposed in parallel with said plunger guide bar so that it is swung in one direction to engage with said abutment means when said plunger is attracted for thereby locking said bread carriage in its nontoasting position and it is swung in the opposite direction by the sliding movement of the spring-urged lever whereby said latch means is disengaged from said abutment means and held at a position at which it is re-engageable with said abutment means.

7. A fully automatic toaster comprising in combination bread toasting heater means, a loadable bread carriage cyclically movable relative to said bread toasting heater means from a nontoasting position to a toasting position and then back to said nontoasting position, thermostat means, a normally open first switch for controlling said bread toasting heater means, electromagnet means for causing vertical movement of said bread carriage from its toasting position to its nontoasting position, a normally open second switch urged to its closed position by said thermostat means upon completion of toasting to thereby control said electromagnet means, a control circuit including said first switch and said second switch which are urged to their open position when said electromagnet means is energized, pivotal lever means having two parallelly disposed pivotal levers mounting said bread carriage on their front ends for causing vertical movement of said bread carriage, and interconnecting means having power spring means for intercommecting said pivotal lever means with said electromagnet means, wherein arrangement is such that closure of said second switch in response to the operation of said thermostat means energizes said electromagnet means to thereby move said lever means through said power spring means to urge said bread carriage toward its nontoasting position, said first switch is deenergized as soon as said electromagnet means is energized, and the entire circuit is deenergized before said bread carriage reaches its nontoasting position and is kept in its deenergized state until said bread carriage is moved again to its toasting position.

8. A fully automatic toaster comprising in combination bread toasting heater means, a loadable bread carriage cyclically movable relative to said bread toasting heater means from a nontoasting position to a toasting position and then back to said nontoasting position, lever means having two parallelly disposed pivotal levers mounting said bread carriage on their front ends for causing vertical movement of said carriage, one of said pivotal levers being pivotally supported at the other end so that its pivotal point is parallelly slidable to and fro by the pressure of a spring for thereby causing swinging movement of said bread carriage, means for normally biasing said bread carriage to its nontoasting position but allowing said bread carriage to freely move to its toasting position by gravity in response to placement of bread on said bread carriage, latch means for locking said bread carriage in its nontoasting position with the bread carried by said bread carriage, electromagnet means horizontally disposed and operatively associated with said lever means for moving said bread carriage to its nontoasting position, L-shaped coil spring means interconnecting the plunger of said electromagnet means with one end of one of said pivotal levers, direction changing lever means having an L-shaped lever disposed concentrically with said coil spring means, said L-shaped lever having one end thereof engaged by said pivotal lever and the other end thereof engaged by one end of said coil spring means, and a stopper disposed at one end of said L-shaped lever to prevent contraction of said coil spring means beyond a predetermined angle, said latch means being urged to its locking position by the force of said coil spring means developed at the attracted position of the plunger of said electromagnet means, said stopper being operative to prevent the force of said coil spring means being imparted to said latch means when said latch means is disengaged from said plunger.

9. A fully automatic toaster comprising in combination bread toasting heater means, a loadable bread carriage cyclically movable relative to said bread toasting heater means from a nontoasting position to a toasting position and then back to said nontoasting position, lever means having two parallelly disposed pivotal levers mounting said bread carriage at their front ends, one of said pivotal levers being pivotally supported at the other end so that its pivotal point is parallelly slidable to and fro for causing swinging movement of said bread carriage, balancing means for normally biasing said bread carriage to its nontoasting position, latch means having a latch element for locking said bread carriage in its nontoasting position with bread carried by said bread carriage and movable in one of two directions by being engaged by a portion of said pivotal lever whose pivot point is movable, electromagnet means for causing upward movement of said bread carriage and arranged to make attraction of its plunger in a horizontal direction, an L-shaped direction changing lever interconnecting the plunger of said electromagnet means with one end of said pivotal lever through a power spring for causing vertical movement of said bread carriage, an auxiliary ledge-like member for preventing any lowering movement of said bread carriage from its nontoasting position when no bread is carried by said bread carriage, an abutment provided on a guide bar connected integrally with the plunger of said electromagnet means and engageable with said latch element at the attracted position of the plunger, a main circuit switch operatively associated with the plunger of said electromagnet means so as to be urged to its open position at the attracted position of the plunger, and switch means adapted to control said electromagnet means in response to operation of a thermostat upon completion of toasting, whereby the main circuit is urged open by the plunger attracting operation of said electromagnet means upon completion of toasting and at the same time said latch element is engaged with said abutment for locking said bread carriage in its nontoasting position by the force of said power spring, while removal of bread from said bread carriage causes disengagement of said latch element from said abutment and said bread carriage is held in its nontoasting position by said balancing means and said auxiliary ledge-like member.

References Cited
UNITED STATES PATENTS 2,806,422  9/1957  Koci _____ 99—331
3,129,649  4/1964  Visos _____ 99—329 XR
3,129,652  4/1964  Kueser _____ 99—329

BILLY J. WILHITE, *Primary Examiner.*